United States Patent
Wallace et al.

(10) Patent No.: US 7,391,759 B2
(45) Date of Patent: *Jun. 24, 2008

(54) METHOD AND APPARATUS FOR PROVIDING WIRELESS COMMUNICATION SYSTEM SYNCHRONIZATION

(75) Inventors: Mark S. Wallace, Bedford, MA (US); Edward G. Tiedemann, Jr., San Diego, CA (US); Charles E. Wheatley, III, Del Mar, CA (US); J. Rod Walton, Westford, MA (US); Steven J. Howard, Ashaland, MA (US)

(73) Assignee: QUALCOMM Incorporated, San Diego, CA (US)

( * ) Notice: Subject to any disclaimer, the term of this patent is extended or adjusted under 35 U.S.C. 154(b) by 653 days.

This patent is subject to a terminal disclaimer.

(21) Appl. No.: 10/383,855

(22) Filed: Mar. 7, 2003

(65) Prior Publication Data

US 2003/0174666 A1     Sep. 18, 2003

(51) Int. Cl.
*H04J 3/06* (2006.01)
(52) U.S. Cl. ........................ 370/350; 370/503
(58) Field of Classification Search ............... None
See application file for complete search history.

(56) References Cited

U.S. PATENT DOCUMENTS

| | | | | |
|---|---|---|---|---|
| 6,002,669 A | * | 12/1999 | White | 370/235 |
| 6,061,343 A | * | 5/2000 | son .ANG.kerberg | 370/345 |
| 6,073,021 A | * | 6/2000 | Kumar et al. | 455/442 |
| 6,141,542 A | * | 10/2000 | Kotzin et al. | 455/101 |
| 6,173,005 B1 | * | 1/2001 | Kotzin et al. | 375/141 |
| 6,263,207 B1 | * | 7/2001 | Kito | 455/453 |
| 6,603,744 B2 | * | 8/2003 | Mizutani et al. | 371/310 |
| 6,661,804 B2 | * | 12/2003 | Fellman et al. | 370/420 |

* cited by examiner

*Primary Examiner*—Andrew C. Lee
(74) *Attorney, Agent, or Firm*—Arnold J. Harnois, Jr.; Thomas R. Rouse; Francois A. Pelaez

(57) ABSTRACT

When insufficient traffic is present in the network to maintain synchronization in this manner, other methods must be used. One approach involves making direct measurements of the timing between base stations. This is accomplished in one of two ways. The base may interrupt its transmissions on all sectors for a short interval during which it determines the time of arrival of signals from other base stations. Given knowledge of the other base station locations, time errors relative to all other base stations may be derived. Alternatively, the base may send a short signal at high power in the mobile transmit band. This time-of-arrival of this signal is measured by the surrounding base stations and the time errors between pairs of base stations are computed. In some cases, a base station may be isolated sufficiently from all other base stations in the network such that direct base-to-base measurement is not viable. In this case, a fixed mobile is placed at a location in the handoff region between the isolated cell and another cell in the network. The fixed mobile either performs measurements of base station pilots on command of the base and reports the timing information, or sends a burst transmission at a specified time and power level to be measured by the base stations.

4 Claims, 6 Drawing Sheets

METHOD AND APPARATUS FOR PROVIDING WIRELESS COMMUNICATION SYSTEM SYNCHRONIZATION

BACKGROUND OF THE INVENTION

I. Field of the Invention

The present invention relates to communication systems. More particularly, the present invention relates to a novel and improved method and apparatus for synchronizing base stations in a wireless communication system.

II. Description of the Related Art

The use of code division multiple access (CDMA) modulation techniques is but one of several techniques for facilitating communications in which a large number of system users are present. Although other techniques, such as time division multiple access (TDMA), frequency division multiple access (FDMA) and AM modulation schemes such as amplitude companded single sideband (ACSSB) are known, CDMA has significant advantages over these other modulation techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS" and U.S. Pat. No. 5,103,459, entitled "SYSTEM AND METHOD FOR GENERATING SIGNAL WAVEFORMS IN A CDMA CELLULAR TELEPHONE SYSTEM", both of which are assigned to the assignee of the present invention and are incorporated by reference. The method for providing CDMA mobile communications was standardized in the United States by the Telecommunications Industry Association in TIA/EIA/IS-95-A entitled "Mobile Station-Base Station Compatibility Standard for Dual-Mode Wideband Spread Spectrum Cellular System", referred to herein as IS-95.

In the just mentioned patents, a multiple access technique is disclosed in which a large number of mobile station users, each having a transceiver, communicate through satellite repeaters or terrestrial base stations (also known as cell base stations or cell-sites) using code division multiple access (CDMA) spread spectrum communication signals. By using CDMA communications, the frequency spectrum can be reused multiple times thus permitting an increase in system user capacity. The use of CDMA techniques result in much higher spectral efficiency than can be achieved using other multiple access techniques.

A method for simultaneously demodulating data that has traveled along different propagation paths from one base station and for simultaneously demodulating data redundantly provided from more than one base station is disclosed in U.S. Pat. No. 5,109,390 (the '390 patent), entitled "DIVERSITY RECEIVER IN A CDMA CELLULAR COMMUNICATION SYSTEM", assigned to the assignee of the present invention and incorporated by reference herein. In the '390 patent, the separately demodulated signals are combined to provide an estimate of the transmitted data which has higher reliability than the data demodulated by any one path or from any one base station.

Handoffs can generally be divided into two categories—hard handoffs and soft handoffs. In a hard handoff, when a mobile station leaves an origination base station and enters a destination base station, the mobile station breaks its communication link with the origination base station and thereafter establishes a new communication link with the destination base station. In soft handoff, the mobile station completes a communication link with the destination base station prior to breaking its communication link with the origination base station. Thus, in soft handoff, the mobile station is redundantly in communication with both the origination base station and the destination base station for some period of time.

Soft handoffs are far less likely to drop calls than hard handoffs. In addition, when a mobile station travels near the coverage boundary of a base station, it may make repeated handoff requests in response to small changes in the environment. This problem, referred to as ping-ponging, is also greatly lessened by soft handoff. An exemplary process for performing soft handoff is described in detail in U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM" assigned to the assignee of the present invention and incorporated by reference herein.

An improved soft handoff technique is disclosed in U.S. Pat. No. 5,267,261, entitled "MOBILE STATION ASSISTED SOFT HANDOFF IN A CDMA CELLULAR COMMUNICATIONS SYSTEM, which is assigned to the assignee of the present invention and incorporated by reference herein. In the system of the '261 patent, the soft handoff process is improved by measuring the strength of "pilot" signals transmitted by each base station at the mobile station. These pilot strength measurements are of assistance in the soft handoff process by facilitating identification of viable base station handoff candidates.

The base station candidates can be divided into four sets. The first set, referred to as the Active Set, comprises base stations, which are currently in communication with the mobile station. The second set, referred to as the Candidate Set, comprises base stations whose signals have been determined to be of sufficient strength to be of use to the mobile station but are not currently being used. Base stations are added to the candidate set when their measured pilot energy exceeds a predetermined threshold $T_{ADD}$. The third set is the set of base stations which are in the vicinity of the mobile station (and which are not included in the Active Set or the Candidate Set). And the fourth set is the Remaining Set which consists of all other base stations.

In IS-95, a base station candidate is characterized by the phase offset of the pseudonoise (PN) sequence of its pilot channel. When the mobile station searches to determine the strength of the pilot signal from a candidate base station it performs a correlation operation wherein the filtered received signal is correlated to a set of PN offset hypotheses. The method and apparatus for performing the correlation operation is described in detail in U.S. Pat. No. 5,644,591, entitled "METHOD AND APPARATUS FOR PERFORMING SEARCH ACQUISITION IN A CDMA COMMUNICATION SYSTEM", which is assigned to the assignee of the present invention and incorporated by reference herein.

The propagation delay between the base station and the mobile station is not known. This unknown delay produces and unknown shift in the PN codes. The searching process attempts to determine the unknown shift in the PN codes. To do this, the mobile station shifts in time the output of its searcher PN code generators. The range of the search shift is called the search window. The search window is centered about a PN shift hypothesis. A base station transmits to the mobile station a message indicating the PN offsets of base station pilots in its physical proximity. The mobile station will center its search window around the PN offset hypothesis.

The appropriate size of the search window depends on several factors including the priority of the pilot, the speed of the searching processors, and the anticipated delay spread of the multipath arrivals. The CDMA standards (IS-95) define three search window parameters. The searching of pilots in both the active and candidate sets is governed by Search Window "A". Neighbor Set pilots are searched over window "N" and Remaining Set pilots over window "R". The searcher window sizes are provided below in Table 1, where a chip is 1/1.2288 MHz.

TABLE 1

| SRCH_WIN_A SRCH_WIN_N SRCH_WIN_R | Window Size (PN chips) | SRCH_WIN_A SRCH_WIN_N SRCH_WIN_R | Window Size (PN chips) |
|---|---|---|---|
| 0 | 4 | 8 | 60 |
| 1 | 6 | 9 | 80 |
| 2 | 8 | 10 | 100 |
| 3 | 10 | 11 | 130 |
| 4 | 14 | 12 | 160 |
| 5 | 20 | 13 | 226 |
| 6 | 28 | 14 | 320 |
| 7 | 40 | 15 | 452 |

Window sizing is a trade-off between search speed and the probability of missing a strong path lying outside the search window.

The base station transmits to the mobile station a message which specifies the PN hypotheses that the mobile station should search relative to its own PN offset. For example, the originating base station may instruct the mobile station to search for a pilot 128 PN chips ahead of its own PN offset. The mobile station in response sets its searcher demodulator 128 chips ahead in the output chip cycle and searches for the pilot using a search window centered about the specified offset. Once the mobile is instructed to a search a PN hypothesis to determine the resources available for performing a handoff, it is critical that the PN offset of the destination base station pilot is very close in time to the directed offset. The speed of searching is of critical importance near base station boundaries because delays in completing the necessary searches can result in dropped calls.

In CDMA systems in the United States, this base station synchronization is achieved by providing each base station with a Global Positioning Satellite (GPS) receiver. However, there are cases where a base station may not be able to receive the GPS signal. For example, within subways and tunnels the GPS signal is attenuated to a degree that prohibits their use for timing synchronization of base stations or micro base stations. In addition, there are national agendas that discourage dependence upon the GPS signal for operation of critical services.

The present invention describes a method and system for providing timing synchronization in these circumstances where a fraction of the network is capable of receiving a centralized timing signal and achieving timing therefrom and a portion of the base stations are not capable of receiving the centralized timing signal. This situation is addressed in copending U.S. patent application Ser. No. 08/933,888 (the '888 application), entitled "MOBILE STATION ASSISTED TIMING SYNCHRONIZATION IN A CDMA COMMUNICATION SYSTEM", filed Sep. 19, 1997, which is assigned to the assignee of the present invention and incorporated by reference herein. In addition, the present invention describes a method and system for providing timing synchronization where no base stations rely on a centralized timing signal.

In the '888 application, the slave base station attains synchronization with the reference base station through messages transmitted from and received by a mobile station in the soft handoff region between the reference base station and the slave base station. First, the round trip delay between the mobile station and the reference base station is measured by the reference base station. Next, the slave base station searches until it acquires the signal transmitted by the mobile station, referred to as the reverse link signal. In response to the acquisition of the reverse link signal, the slave base station adjusts its timing so that the mobile station can acquire its signal, referred to as a forward link signal. This step may be unnecessary if the timing error in the slave base station is not severe.

Once the mobile station acquires the signal from the slave base station, it measures and reports the difference between the amount of time it takes a signal to travel from the reference base station to it and the amount of time it takes a signal to travel from the slave base station to it. The last measurement necessary is a measurement by the slave base station of the time difference between the time it received the reverse link signal from the mobile station and the time it transmitted a signal to the mobile station.

A series of computations are performed upon the measured time values to determine the time difference between the slave base station and an adjustment of the slave base station timing is performed in accordance therewith. It should be noted that all of the measurements mentioned are performed during the normal operation of an IS-95 CDMA communication system.

SUMMARY OF THE INVENTION

The present invention is a novel and improved method and apparatus for synchronizing base stations in a wireless communication system. The present invention describes methods by which a wireless communication system keeps itself synchronized without an external reference. One method, disclosed in "MOBILE STATION ASSISTED TIMING SYNCHRONIZATION IN A CDMA COMMUNICATION SYSTEM" application Ser. No. 08/933,888, is to use the messaging of mobiles in handoff to determine the relative timing of pairs of base stations. Given the measured timing errors, the base stations' timing is adjusted to maintain network synchronization.

When insufficient traffic is present in the network to maintain synchronization in this manner, other methods must be used. One approach involves making direct measurements of the timing between base stations. This is accomplished in one of two ways. The base may interrupt its transmissions on all sectors for a short interval during which it receives forward link signals from other base stations. Given knowledge of the other base station locations, time errors relative to all other base stations may be derived. Alternatively, a base station sends a short signal at high power in the mobile transmit band. The time-of-arrival of this signal is measured by the surrounding base stations and the time errors between pairs of base stations are computed.

In some cases, a base station may be isolated sufficiently from all other base stations in the network such that direct base-to-base measurement is not possible. In this case, a fixed dummy station is placed at a location in the handoff region between the isolated cell and another cell in the network. The fixed dummy station either performs measurements of base station pilots on command of the base and reports the timing information, or sends a burst transmission at a specified time to be measured by the base stations.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. Base Station Blanking

When there is insufficient data from mobile stations in handoff, the handoff messaging of mobile stations cannot be used to perform the synchronization. This is likely when there is very little traffic, or when the mobile stations are largely stationary. In the first exemplary embodiment of the present invention, a base station receives the forward link transmissions from a neighboring base station or set of neighboring base stations. The base station extracts necessary timing information from the signal received from the other base station.

Figure 1:
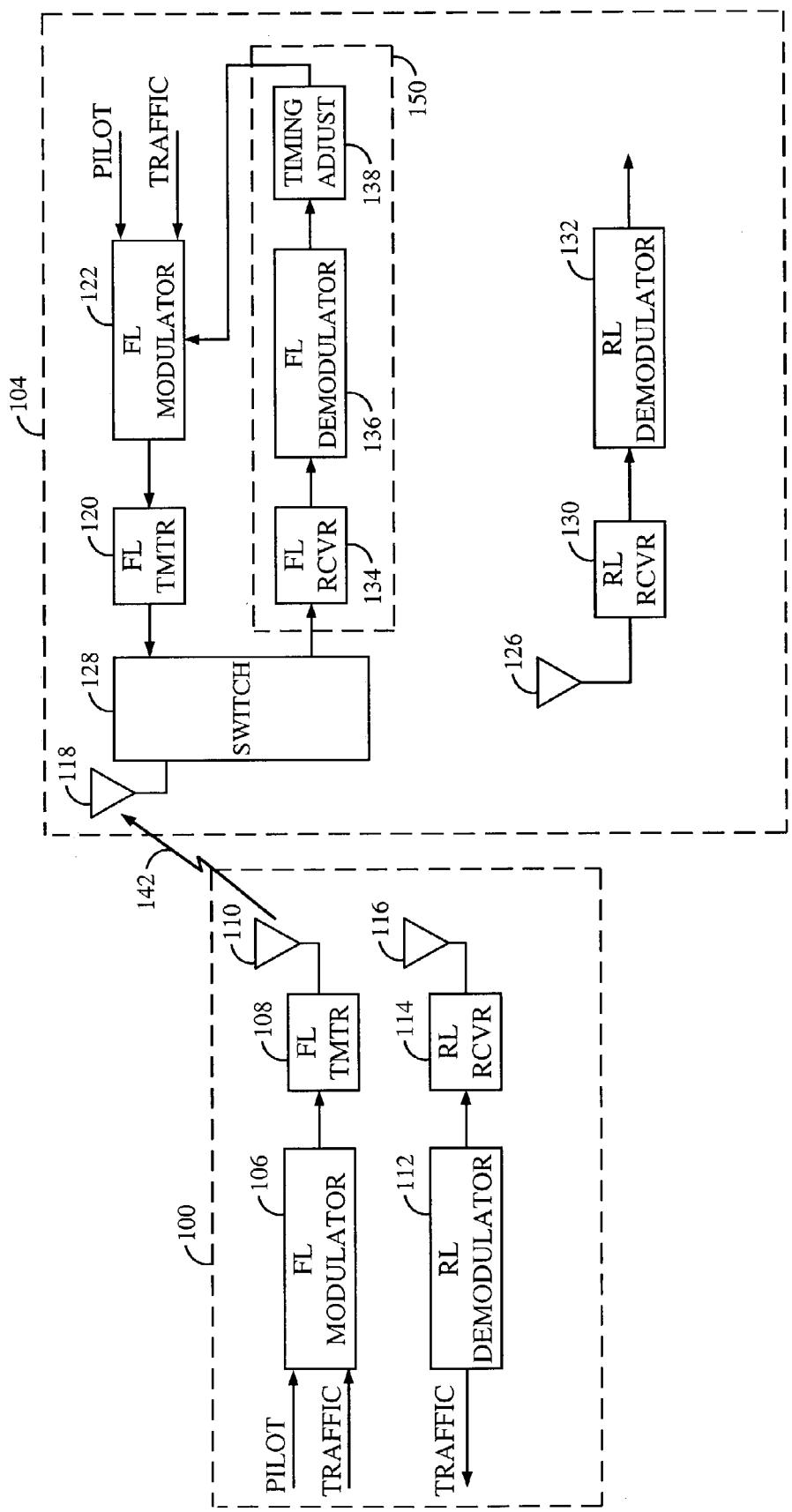
FIG. 1 is a block diagram illustrating the first embodiment of the present invention wherein a base station receives the forward link signal of a neighboring base station and adjusts its timing in accordance with the received signal.

Because all base stations transmit on the same frequency, a base station must inhibit its forward link transmission in order to permit reception of the signals from other base stations. Referring to FIG. 1, base station 104 is configured to receive the forward link signal from base station 100 in order to synchronize its timing with that of base station 100. If base station 104 has multiple sectors (not shown), then preferably all sectors will cease forward link transmission simultaneously because the backlobes of an antenna will exceed the signal levels of transmissions from base station 100. Receiving the forward link signal from base station 100, requires base station 104 to have a forward link receiver subsystem 150 to receive the forward link signals from base station 100.

Because base stations are designed to cover a particular area, with some overlap of the coverage area of the adjacent cells, it is not necessarily true that a base station can receive signals from other base stations. However, in most deployments this is unlikely to be a problem. For example, if the base stations have roughly circular (or hexagonal) coverage areas with about the same radius, then the distance between base stations is about double the coverage radius. In the COST-231 propagation model, the path loss increases by about 10 or 11 dB with a doubling of distance, assuming base station antenna heights in the range of 20-60 m. This is a relatively small increase in path loss that is easily offset by:

1. Longer integration time on the pilot. Because both transmitter and receiver are stationary in this case, a reasonably long PN integration is possible (if necessary).
2. No penetration losses, generally assumed for in-car or indoor operation.
3. High gain base station antennas.
4. Base station antenna heights greater than average mobile heights.
5. Reduced local clutter. So, enough signal is available in the vast majority of cases.

It may also be necessary to prohibit forward link transmissions on more than one base station at the same time in order to perform the forward link measurement. For example, there may be cases where a pair of base stations has a clear line-of-sight (LOS) path between them, but all other neighboring base stations are not visible. In this case, when one of the pair blanks its transmission it can receive only the signal from the other base station of the pair, since that base stations signal masks the other neighbor base stations' weaker signals. The same result occurs when the other base station of the pair blanks its transmission. The result is that the two base stations are isolated and cannot determine their timing relative to the rest of the network. Connection with the rest of the network is only possible if both base stations blank simultaneously. The same sort of problem can arise with larger collections of base stations that are effectively isolated from the network unless certain specific patterns of blanking are employed.

To avoid the detailed analysis of the network that may be required to determine the blanking patterns, a simple approach of randomly blanking at a given fixed intervals is employed. At predetermined time intervals, each base station decides in a randomized fashion whether or not to blank its transmissions. In the exemplary embodiment, the probability of randomly determining to blank is set at 50%. In this manner about 50% of the base stations in the system are off every few minutes. In this manner, each base eventually gets to see all of its neighbors.

Given the known locations of base stations, the propagation delays between base stations may be removed from the time-of-arrival estimates, and the timing differences between cells determined. The timing errors may be used to adjust the base station timing, either using a centralized processor or processing in individual base stations, possibly based on a pre-established base station hierarchy.

Blanking the base stations affects the forward link for all active mobile stations. To minimize this impact the blanking time should be short. The active mobile stations in the coverage area of a blanked base station increase their transmit power by about 1 dB per millisecond when the forward link signal disappears. If the blanking is only 5 msec, then the recovery time is about 6 msec, and most mobile stations will only lose a single frame. If the blanking extends to more than 10 msec, then more than 1 frame will likely be lost. However, loss of 2 consecutive frames every 2 minutes is only a frame error rate (FER) increase of 0.03%. This is not significant relative to a typical operating FER of 1% or greater.

Forward link signals transmitted from base stations 100 and 104 are transmitted on a first frequency. Reverse link signals transmitted from mobile stations (not shown) to base stations 100 and 104 are transmitted on a second frequency. In the exemplary embodiment, the forward link signals and the reverse link signals are code division multiple access (CDMA) signals. An exemplary embodiment for transmitting full duplex CDMA signals is described in detail in U.S. Pat.

No. 4,901,307, entitled "SPREAD SPECTRUM MULTIPLE ACCESS COMMUNICATION SYSTEM USING SATELLITE OR TERRESTRIAL REPEATERS", which is assigned to the assignee of the present invention and incorporated by reference herein.

In base station 100, pilot symbols and forward link traffic data are provided to forward link modulator 106. In the exemplary embodiment, forward link modulator 106 is code division multiple access modulator as described in detail in the aforementioned U.S. Pat. No. 5,103,459. The code division multiple access signal is provided to forward link transmitter (FL TMTR) 108 which upconverts, filters and amplifies the forward link signal for transmission through antenna 110.

In addition, reverse link signals are received through antenna 116 and provided to reverse link receiver (RL RCVR) 114. Receiver 114 downconverts, filters and amplifies the received reverse link signal and provides the received signal to reverse link demodulator 112. An exemplary embodiment for demodulating CDMA signals is described in U.S. Pat. No. 5,654,979, entitled "CELL SITE DEMODULATOR ARCHITECTURE FOR A SPREAD SPECTRUM MULTIPLE ACCESS COMMUNICATION SYSTEM", which is assigned to the assignee of the present invention and incorporated by reference herein.

In addition to being capable of transmitting forward link signals and receiving reverse link signals, base station 104 is capable of receiving forward link signals transmitted by base station 100. In base station 104, pilot symbols and forward link traffic data are provided to forward link modulator 122. In the exemplary embodiment, forward link modulator 122 is code division multiple access modulator as described in detail in the aforementioned U.S. Pat. No. 5,103,459. The code division multiple access signal is then provided to forward link transmitter (FL TMTR) 120 which upconverts, filters and amplifies the forward link signal and provides the signal through switch 128 for transmission through antenna 118.

Reverse link signals are received through antenna 126 and provided to reverse link receiver (RL RCVR) 130. Receiver 130 downconverts, filters and amplifies the received reverse link signal in accordance with the reverse link frequency band and provides the received signal to reverse link (RL) demodulator 132. An exemplary embodiment of the method and apparatus for demodulating reverse link CDMA signals is described in detail in aforementioned U.S. Pat. No. 5,654, 979.

Forward link signals transmitted from base station 100 are also capable of reception by base station 104. When base station 104 is prepared to perform the timing synchronization operation, switch 128 toggles such that instead of providing data for transmission from forward link transmitter 120 to antenna 118, signals received by antenna 118 are provided to forward link receiver subsystem 150. Forward link receiver (FL RCVR) 134 downconverts, filters and amplifies the received reverse link signal in accordance with the forward link frequency band and provides the received signal to forward link (FL) demodulator 136. In the exemplary embodiment, the signals received include pilot symbols provided to facilitate acquisition and provided for coherent demodulation of the traffic channels. An exemplary embodiment for acquiring the forward link pilot signal is described in detail in U.S. Pat. No. 5,644,591, entitled "METHOD AND APPARATUS FOR PERFORMING SEARCH ACQUISITION IN A CDMA COMMUNICATION SYSTEM", which is assigned to the assignee of the present invention and incorporated by reference herein.

The demodulated pilot signal is provided from forward link demodulator 136 to timing adjustment element 138. Timing adjustment element 138 determines a timing correction factor that is provided to forward link modulator 122 to adjust its timing to provide synchronization between base stations 100 and 104.

Figure 2:
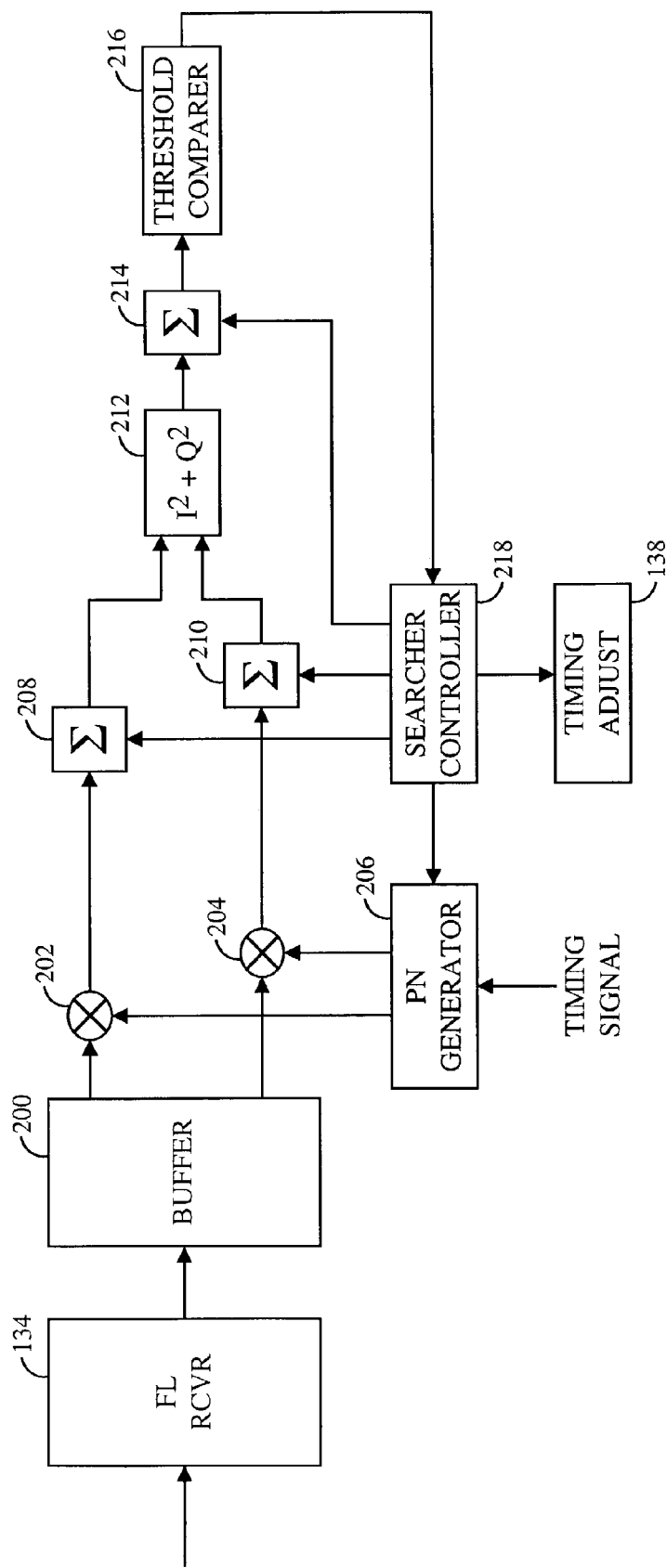
FIG. 2 is a block diagram illustrating the mobile receive subsystem.

FIG. 2 illustrates mobile receive subsystem 150 in greater detail. Mobile receiver subsystem 150 in base station 104 attempts to align the pseudonoise signal generated by PN generator 206 with the forward link signal received from base station 100. In the exemplary embodiment, PN generator 206 generates the PN signals $PN_I$ and $PN_Q$ by means of linear feedback shift registers which generate the PN code sequences for spreading and despreading the pilot signals. Thus, the operation of obtaining synchronization between the codes used to despread the received pilot signal and the PN spreading code of the received pilot signal involves determining the time offset of the linear feedback shift register within PN generator 206.

The spread spectrum signal is provided to forward link receiver (FL RCVR) 134. Receiver 134 downconverts, filters and amplifies the signal and provides the signal to optional buffer 200. Buffer 200 provides the received samples to despreading elements 202 and 204. Despreading elements 202 and 204 multiply the received signal by the PN code generated by PN generator 206. Due to the random noise like nature of the PN codes, the product of the PN code and the received signal should be essentially zero except at the point of synchronization.

Searcher controller 218 provides an offset hypothesis to PN generator 206. Searcher controller 218 determines a window for searching for the forward link pilot signal from base station. In the exemplary embodiment, each base station is a predetermined PN offset from its neighboring base stations. In the exemplary embodiment, base station 104 knows the predetermined PN offset between its forward link pilot signal and the forward link pilot signal from base station 100 ($PN_{RELATIVE}$). In addition, base station 104 knows the distance between base station 100 and base station 104 (R). Thus, in the exemplary embodiment, searcher controller 218 centers its pilot search at a PN sequence ($PN_{center}$) determined in accordance with the equation:

$$PN_{center} = PN_{104} + PN_{RELATIVE} + R/c, \quad (1)$$

Where $PN_{104}$ is the PN offset of base station 104 and c is the speed of light. By centering the pilot search window at the location that the pilot signal would be found if base stations 100 and 104 were synchronized, the deviation from the center of the search window is equal to the timing error between base stations 100 and 104.

In accordance with this spreading format, the forward link pilot signal offset from forward link modulator 122 is provided to searcher controller 218. Searcher controller 218 advances or retards the PN generator to compensate for the predetermined phase offset between the spreading code of base station 100 and base station 104. In addition, searcher controller 218 compensates for the propagation of the signal to travel from base station 100 to base station 104. The time shifting of PN generator 206 can be performed by bank loading the taps of the linear shift register within PN generator 206 or by masking the output to provide a shifted PN sequence or by combination of these two methods as is known in the art. This initial phase information for performing the search for the pilot of base station 100 is provided from searcher controller 218 to PN generator 206.

In the exemplary embodiment, the received signal is modulated by quaternary phase shift keying (QPSK), so PN generator 206 provides a PN sequence for the I modulation component and a separate sequence for the Q modulation component to despreading elements 202 and 204. Despreading elements 202 and 204 multiply the PN sequence by its corresponding modulation component and provide the two output component products to coherent accumulators 208 and 210.

Coherent accumulators 208 and 210 sum the product over the length of the product sequence. Coherent accumulators 208 and 210 are responsive to signals from searcher controller 218 for resetting, latching and setting the summation period. The sums of the products are provided from summers 208 and 210 to squaring means 214. Squaring means 214 squares each of the sums and adds the squares together.

The sum of the squares is provided by squaring means 212 to non-coherent combiner 214. Noncoherent combiner 214 determines an energy value from the output of squaring means 212. Noncoherent accumulator 214 serves to counteract the effects of a frequency discrepancy between the base station transmit clocks and the mobile station receive clock and aids in the detection statistic in a fading environment. Noncoherent accumulator 214 provides the energy signal to comparator 216. Comparator 216 compares the energy value to predetermined thresholds supplied by searcher controller 218. The results of each of the comparisons is then fed back to searcher controller 218. The results fed back to searcher controller 218 include both the energy of the correlation and the PN offset that resulted in the measurement.

In the present invention, searcher controller 218 outputs the PN phase at which it synchronized to base station 100 to timing adjustment element 138. Timing adjustment element 138 compares the PN offset with the hypothetical PN phase offset generated in accordance with the timing signal from forward link modulator 106, the known propagation path delay and the predetermined phase offset between the PN sequences of base stations 100 and 104. A timing error signal is provided from timing adjustment element 138 to forward link modulator 122. In response forward link modulator 122 adjusts its timing signal for the generation of its forward link spreading signal.

In an alternative embodiment, described in the proposed European Telecommunications Standards Institute (hereafter WCDMA) UMTS Terrestrial Radio Access ITU-R RTT Candidate Submission describes a method of PN spreading wherein each base station uses a distinct PN sequence generator (referred to as an orthogonal Gold code generator). In order to facilitate initial acquisition and handoff, it is desirable to have the base station PN sequences time aligned so that the mobile station can search a reduced search hypothesis window which in turn reduces acquisition time and lessens the probability of dropped calls during handoff.

In accordance with the proposed WCDMA spreading format, a timing signal from forward link modulator 122 would be provided to searcher controller 218. Searcher controller 218 compensates this timing signal in accordance with the known propagation path delay from base station 100 to base station 104. This provides a phase reference used to initialize the PN generator 206. PN generator 206 can be bank loaded in accordance with this timing offset. The key difference between synchronizing a system based on different spreading functions and those base on offsets of a single spreading function is that those systems base on different spreading functions would require the additional step of extracting a time reference from the received spreading function that is a time relative to a known phase of the two spreading functions.

II. Transmissions from Base Stations on Mobile Frequencies

An alternative to blanking base station transmissions and detection of the neighboring base station transmissions is to periodically transmit a short probe from a base station on the mobile station transmit frequency. Normally, CDMA mobile station transmissions near a base station are at very low power, but these short transmissions would be of sufficient power to reach the neighboring base stations. For the time interval during which the base station transmits on the reverse link frequency band, the reverse link receiver in the base station is unable to demodulate reverse link signals from mobile stations in the coverage area of the base station. In addition, other nearby base stations might be adversely affected by the reverse link transmission from the base station, and frame erasures might result. As with the base station blanking, this would occur infrequently, so that the overall system performance would be minimally impacted.

Scheduling of these transmissions is required so that all base stations know at what time to search for the timing probe. A base station in need of synchronization would request that measurement of its probe be performed by neighboring base stations. The data indicative of the base station timing is then used with the known distance between base stations to develop a set of timing error values. As with the previous method the timing error values are then used to adjust the timing of various base stations in the network.

As with the base blanking approach, the link budget for transmission of the probe from base station to base station must be sufficient to overcome the additional path loss due to the larger distance. The same 10 or 11 dB increase in path loss is to be expected, and the same mitigating factors discussed above apply to this approach. If we assume that the base station uses a standard mobile station power amplifier (~200 mW) for its transmitter, then the base station blanking approach has a larger link margin given that the base station pilots are generally transmitted at 10-20% of the base HPA, i.e., the pilot is transmitted at about 1-4W. However, the factors discussed above are much larger than the difference in power amplifier size, so for most networks either technique would apply equally well.

Figure 3:
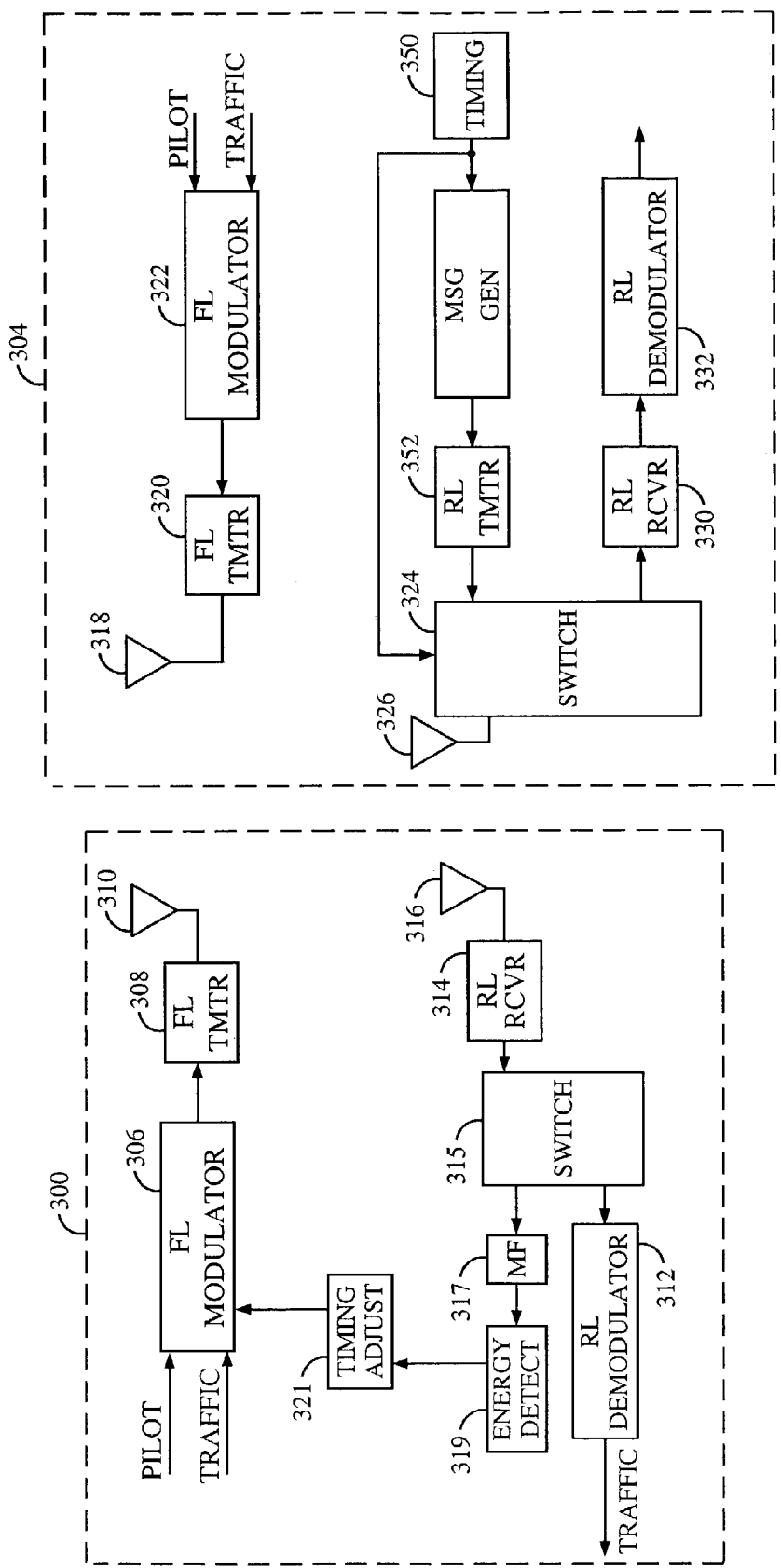
FIG. 3 is a block diagram illustrating the second embodiment of the present invention wherein a base station is capable of transmitting a message on the reverse link to a neighboring base station which adjusts its timing in accordance with the received signal.

FIG. 3 illustrates the second exemplary embodiment for synchronizing the timing between two base stations—base station 300 and base station 304. As described earlier, forward link signals are transmitted in a first frequency band and reverse link signals are transmitted in a second frequency band. In the exemplary embodiment, the forward link signals and the reverse link signals are code division multiple access (CDMA) signals.

As described above base station 300 knows when to search for the probe sequence from base 304. One method for providing this information to base station 300 is for base station 304 to send a request message to a base station controller (not shown) that is in communication with both base station 300 and base station 304. In response to the request message from base station 304, the base station controller generates a probe schedule message indicating the time at which the probe is to be transmitted by base station 304 and provided this message to base station 300. The difference between the scheduled time for receipt of the probe at base station 300 and the time at which base station 300 does receive the probe from base station 304 is the time error in base station 300 with the assumption that the timing clock in base station 304 is correct.

Base station 304 includes all of the circuitry necessary for typical operation. In addition, base station 304 includes the capability of transmitting messages on the reverse link frequency band while simultaneously inhibiting reception of reverse link signals. In base station 304, pilot symbols and forward link traffic data are provided to forward link modulator 322. In the exemplary embodiment, forward link modulator 322 is code division multiple access modulator as described in detail in the aforementioned U.S. Pat. No. 5,103,459. The code division multiple access signal is then provided to forward link transmitter (FL TMTR) 320, which upconverts, filters and amplifies the forward link signal for transmission through antenna 318.

Reverse link signals are received through antenna 326 and provided through switch 324 to reverse link receiver (RL RCVR) 330. Receiver 330 downconverts, filters and amplifies the received reverse link signal in accordance with the reverse link frequency band and provides the received signal to reverse link (RL) demodulator 332. An exemplary embodiment of a method and apparatus for demodulating CDMA signals is described in aforementioned U.S. Pat. No. 5,654,979.

When base station 304 is ready to transmit a synchronization probe on the reverse link to base station 300, switch 324 toggles such that instead of providing the data received on antenna 326 to receiver 330, data for transmission is provided by switch 324 from reverse link transmitter (RL TMTR) 352 to antenna 326. The toggling of switch 324 prevents the timing message transmitted on the reverse link frequency band from being received by the reverse link receiver 330. This prevents the signal transmitted from base station 304 on the reverse link from damaging the receiver hardware in base station 304.

At a designated time ($t_{transmit}$), timing element 350 outputs a trigger signal to message generator 337 and to switch 324. Switch 324 toggles in response to the trigger signal from timing element 350. In response to the trigger signal from timing element 350, message generator (MSG GEN) 337 generates a predetermined symbol sequence which is provided to reverse link transmitter (RL TMTR) 352. Reverse link transmitter 352 upconverts, filters and amplifies the signal. The signal output by reverse link transmitter 352 is provided through switch 324 for transmission through antenna 326.

In base station 300, pilot symbols and traffic data are provided to forward link (FL) modulator 306. In the exemplary embodiment, forward link modulator 306 is code division multiple access modulator as described in detail in the aforementioned U.S. Pat. No. 5,103,459. The CDMA signal is then provided to forward link transmitter (FL TMTR) 308 which upconverts, filters and amplifies the forward link signal for transmission through antenna 310.

Reverse link signals are received in base station 300 through antenna 316 and provided to reverse link receiver (RL RCVR) 314. Receiver 314 downconverts, filters and amplifies the received reverse link signal and provides the received signal through switch 315 to reverse link (RL) demodulator 312. An exemplary embodiment for demodulating reverse link CDMA signals is described in aforementioned U.S. Pat. No. 5,654,979.

At a designated time, switch 315 toggles so as to provide the reverse link data through switch 315 to matched filter (MF) 315. In the exemplary embodiment, the designated time to toggle switch 315 ($t_{switch}$) will be determined in accordance with the equation:

$$t_{switch} = t_{transmit} + R/c - t_{window}/2, \quad (2)$$

where $t_{transmit}$ is the designated time to transmit the probe from base station 304, R is the distance between base station 300 and base station 304, c is the speed of light and $t_{window}$ is a windowing function over which base station 300 will search for the probe from base station 304.

At the designated switching time, the received signal is provided through switch 315 to matched filter 317. In a first embodiment of switch 315, switch 315 continues to provide the reverse link signal to reverse link demodulator 312 while providing the reverse link signal to matched filter 317. If the probe is transmitted at sufficient energy that the reverse link is essentially interrupted during the transmission, switch 315 may for a period inhibit the provision of the reverse link signal to reverse link demodulator 312.

Matched filter 317 is designed to provide the maximum signal to noise power ratio at its output for the predetermined transmitted sequence. Realizations of matched filter 317 are well known in the art. Two methods of realizing matched filter 317 include use of a convolution base matched filter and a correlator based matched filter. The function of matched filter 317 is to output a high power signal when the predetermined sequence is received.

The output from matched filter 317 is provided to energy detector 319. Energy detector 319 detects the reception of the synchronization probe by identification of sufficiently high correlation energy from matched filter 317. Upon detection of receipt of the synchronization probe, energy detector 319 sends a signal to timing adjustment element 321. Timing adjustment element 321 compares the time of receipt of the probe from base station 304 with the time at which it anticipated receiving the probe from base station 304, as described previously the difference is indicative of the timing error between base station 300 and base station 304. A timing adjustment signal is provided from timing adjustment element 321 to forward link modulator 306. In response to the timing adjustment signal, the internal clocks of base station 300 are adjusted.

III. Use of Fixed Stations to Measure Base Station Transmissions.

A problem occurs with the methods above when there is a base station that cannot see any other base stations. For instance, a base station in a subway may be isolated from all other base stations, but still able to receive signals from mobile stations which are in handoff with other base stations. Effectively, the signal needs to go around a very sharp corner in order to go from one base station to the other, but a mobile station in the proper location is able to receive signals from both base stations.

To cover these cases where there is no base station to base station propagation path, a fixed dummy station is installed which delivers pilot phase measurements on command. Since the fixed dummy stations are stationary and at known locations, estimates of timing error between two base stations may be made as long as the fixed dummy station can measure pilots from both base stations, and report the measurement to one of the base stations. The base station uses the distances from the base stations to the fixed dummy station together with the relative pilot delays reported in the message to determine its timing relative to the other base station.

If it is difficult to place the fixed dummy station in the region where the base stations are close to the same power level, then it may be necessary to employ blanking of the nearer base station in order to measure the delay to both base stations. In order to accomplish this, the base station tells the fixed dummy station to perform two pilot measurements, one before the blanking and one during. The combination of information in these measurements is then equivalent to the single measurement made on two pilots simultaneously.

The performance of fixed dummy stations depends on the relative strengths of the base stations to be measured. Assuming a pilot at −7 dB Ec/Ior, and another base station 10 dB stronger, the weak pilot is at −17 dB Ec/Io. In order to get 90% detection probability in Rayleigh fading and a false alarm rate of 10%, an SNR of 21 dB is required, so integration over 6000 chips is necessary. This is about 5 msec with a chip rate of 1.23 MHz. If the other base station is 20 dB stronger, then integration over 50 msec is required. Coherent integration over 50 msec is probably possible for a fixed dummy station, but does require significant processing to consider the various delay hypotheses. The acceptable level of coherent integration determines how closely matched the path losses between the two base stations must be to avoid the requirement of blanking the nearby base station.

Figure 4:
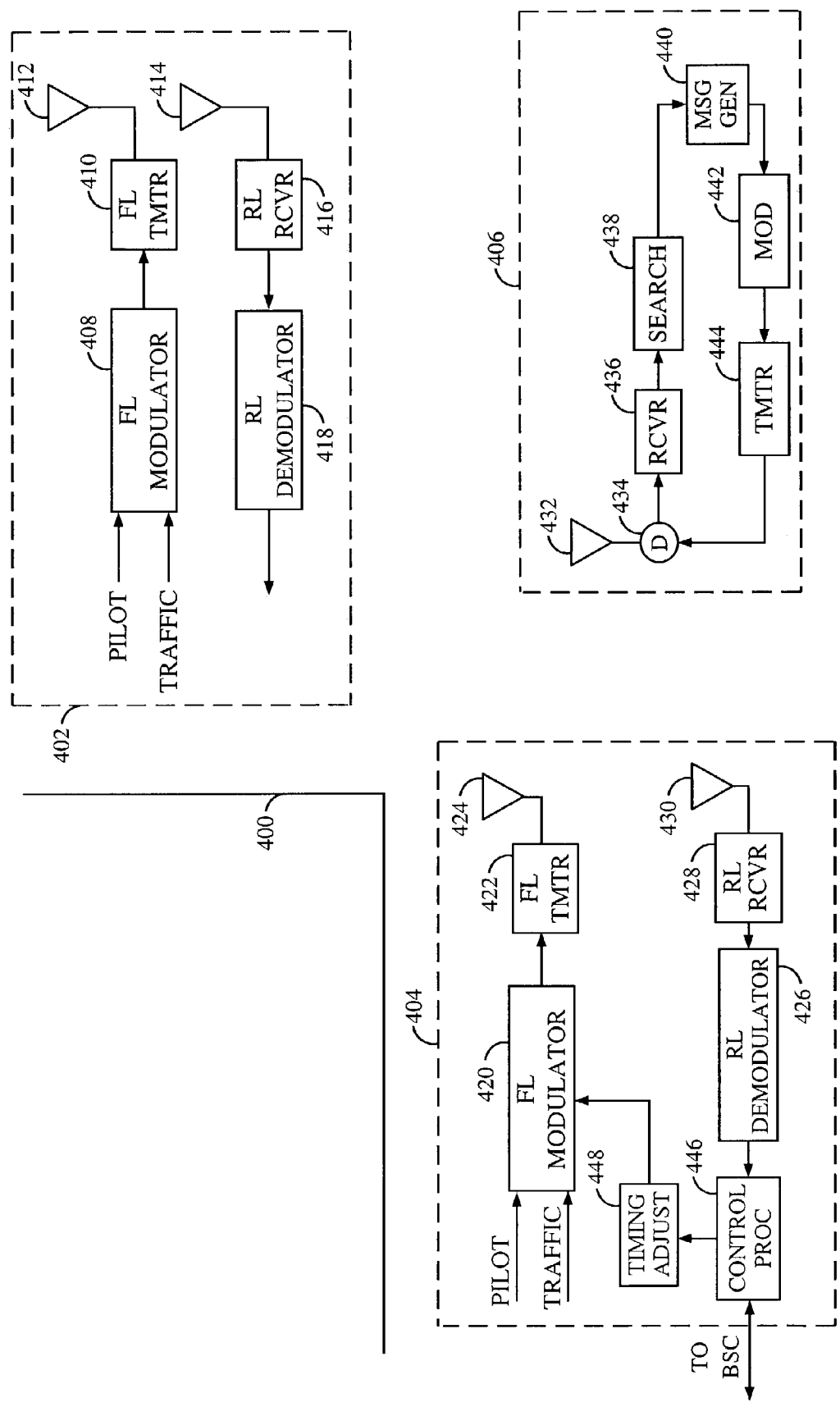
FIG. 4 is a block diagram illustrating the fourth embodiment of the present invention wherein a fixed dummy station receives the forward link signals from two base stations and transmits a message to one of the base stations indicating the timing relationship of the two base stations as received at the fixed dummy station.

FIG. 4 illustrates the case where there is no base station to base station propagation path. Obstruction 400 blocks any propagation path between base station 402 and base station 404. To deal with the lack of a propagation path between base stations 402 and 404, fixed dummy station 406 is situated so that there exists a propagation path between base station 402 and fixed dummy station 406 and base station 404 and fixed dummy station 406. Because fixed dummy 406 is stationary and at a known location, estimates of timing error between base stations 402 and 404 may be made as long as the fixed dummy station can measure the phase of forward link signals from both base stations 402 and 404, and report the measurement to one of the base stations.

In base station 402, the pilot and traffic symbols are provided to forward link (FL) modulator 408. In the exemplary embodiment, forward link modulator 408 is code division multiple access modulator as described in detail in the aforementioned U.S. Pat. No. 5,103,459. The code division multiple access signal is then provided to forward link transmitter (FL TMTR) 410, which upconverts, filters and amplifies the forward link signal for transmission through antenna 412. Reverse link signals are received through antenna 414 and provided to reverse link receiver (RL RCVR) 416. Receiver 416 downconverts, filters and amplifies received reverse link signals in accordance with the reverse link frequency band and provides the received signal to reverse link demodulator 418. An exemplary embodiment of a method and apparatus for demodulating CDMA signals is described in aforementioned U.S. Pat. No. 5,654,979.

Similarly, in base station 404, the pilot and traffic symbols are provided to forward link (FL) modulator 420. In the exemplary embodiment, forward link modulator 420 is code division multiple access modulator as described in detail in the aforementioned U.S. Pat. No. 5,103,459. The code division multiple access signal is then provided to forward link transmitter (FL TMTR) 422, which upconverts, filters and amplifies the forward link signal for transmission through antenna 424. Reverse link signals are received through antenna 430 and provided to reverse link receiver (RL RCVR) 428. Receiver 428 downconverts, filters and amplifies received reverse link signals in accordance with the reverse link frequency band and provides the received signal to reverse link (RL) demodulator 426.

The forward link signals from both base stations 402 and 404 are received by antenna 432 of fixed dummy station 406. The signal is provided through duplexer 434 to receiver (RCVR) 436. Receiver 436 downconverts, filters and amplifies the signal in accordance with the reverse link frequency. The received signals are provided to searcher (SEARCH) 438. Searcher 438 determines the PN offset of the forward link signals transmitted by base stations 402 and 404. In the exemplary embodiment, the forward link signals include a set of pilot symbols which can be used for easier acquisition of the forward link signals from base stations 402 and 404.

The PN offsets of the received forward link signals are provided to message generator (MSG GEN) 440. Message generator 440 generates a message indicative of the PN offsets of the received signals from base stations 402 and 404 and provides the message to modulator (MOD) 442. In the exemplary embodiment, modulator 442 is a CDMA modulator as described in detail in U.S. Pat. No. 5,103,459.

In the exemplary embodiment, the message is transmitted as an access probe on the access channel of either base station 402 or base station 404. The generation of an access channel is well known in the art. In the exemplary embodiment of an IS-95 based CDMA access channel, the access probe is initially covered using a predetermined long PN sequence which is known by the base station and the fixed dummy station 406. In the exemplary embodiment, the probe is then covered by a short PN sequence and then transmitted to the base station. The exemplary embodiment for generating an access channel in a CDMA communication system is described in detail in U.S. Pat. No. 5,544,196, entitled "APPARATUS AND METHOD FOR REDUCING MESSAGE COLLISION BETWEEN MOBILE STATIONS SIMULTANEOUSLY ACCESSING A BASE STATION IN A CDMA CELLULAR COMMUNICATIONS SYSTEM", which is assigned to the assignee of the present invention and incorporated by reference herein.

In the exemplary embodiment, the access probe carrying information regarding the PN offset of the detected pilots from base stations 402 and 404 is received by either base station 402 or base station 404. In the exemplary embodiment, the access probe is transmitted to base station 404. In base station 404, the probe is received by antenna 430 and provided to reverse link receiver (RL RCVR) 428. Receiver 428 downconverts, filters and amplifies the received probed in accordance with the reverse link frequency band. The received signal is then provided to reverse link (RL) demodulator 424 which demodulates the probes and extracts the measured PN phase offsets.

The measured PN phase offsets are provided to control processor (Control Proc) 446. Control Processor 446 computes the relative error in the timing between base station 404 and base station 402 as described with respect to equation (1) above. The computed change to the timing is provided to timing adjust element 448 which brings the clocks of base station 404 into synchronization with the clocks of base station 402 in response to the computed timing adjustment.

Performing the necessary timing adjustment in the base station provides for a fast adjustment to the timing. In an alternative embodiment, base station 404 can send the information in the access probe back to a central controller such as a base station controller (not shown). The necessary computations can then be performed at the base station controller and the necessary timing shift can then be transmitted back to the base stations. This embodiment has the additional factor of permitting information from many base stations to be jointly evaluated and system wide synchronization can be performed in fewer instances.

IV. Use of Fixed Stations to Transmit Probes to Base Stations

The fixed dummy station may also be used to transmit probes on command. These probes are transmitted at a power level sufficient to reach a desired set of neighboring cells where timing is to be adjusted. As with the mobile measurements described above, the time error estimates are derived from time-of-arrival measurements at the base stations and the known distances from the cells to the fixed mobile.

Figure 5:
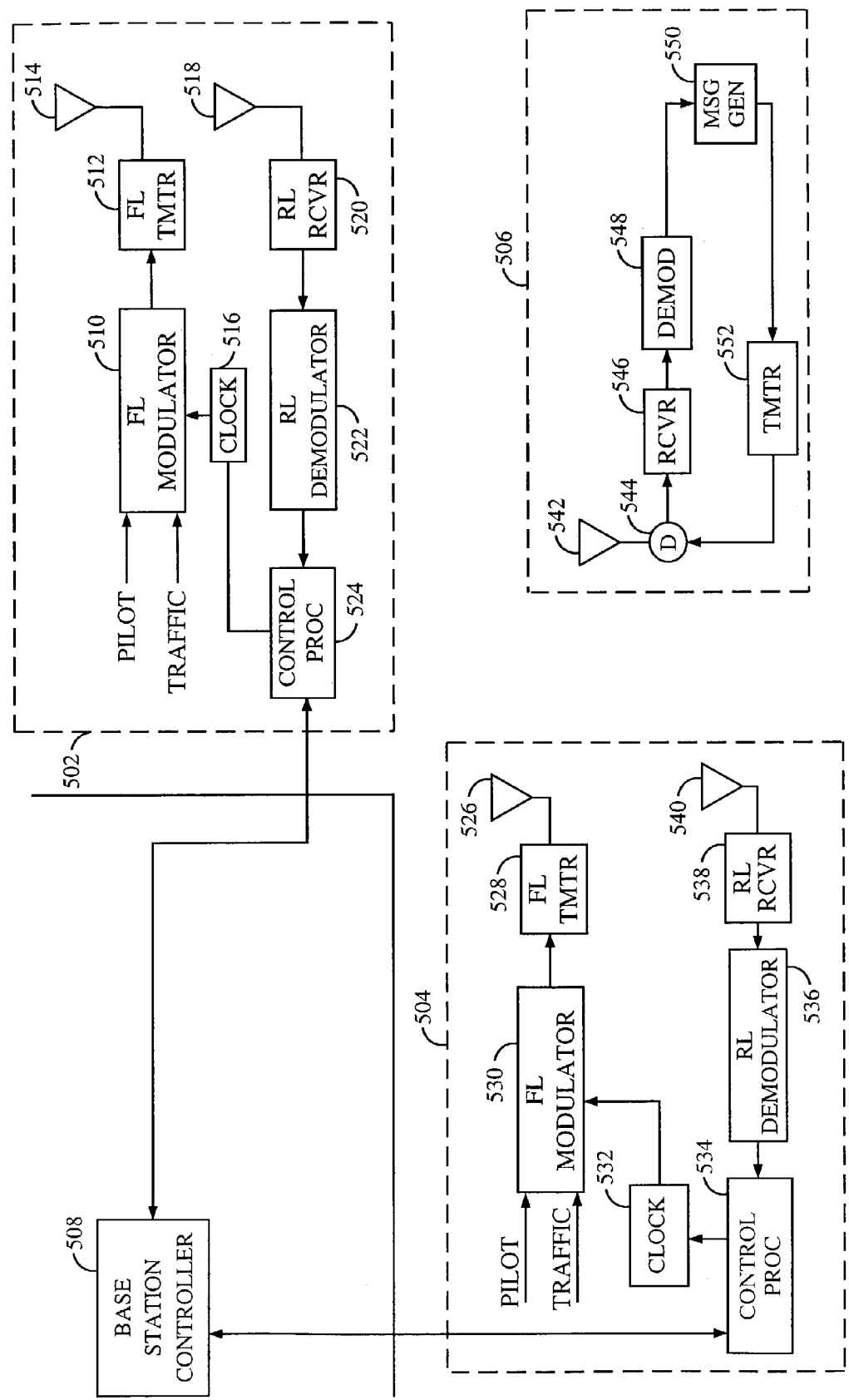
FIG. 5 is a block diagram of the fifth embodiment of the present invention wherein a fixed dummy station transmits a probe to two base stations which use the time of arrival of the probe to synchronize their internal clocks.

Referring to FIG. 5, when synchronization is to be performed by between base station 502 and base station 504, a request message is transmitted to mobile station 506. The probe request message is received at fixed dummy station 506 by antenna 542. The received signal is provided through duplexer 544 to forward link receiver (RCVR) 546. Receiver 546 downconverts, filters and amplifies the received signal in accordance with the reverse link frequency band. The received signal is provided to demodulator (Demod) 548, which demodulates the received signal and detects the reception of a probe request message.

Upon receipt of the probe request message demodulator 548 provides a trigger signal to message generator (MSG GEN) 550. Message generator 550 generates a predetermined symbol sequence and provides the sequence to reverse link transmitter (TMTR) 552. Transmitter 552 upconverts, filters and amplifies the signal in accordance with the reverse link frequency band and provides the signal through duplexer 544 for transmission by antenna 542.

At base station 504, the probe signal is received by antenna 540 and provided to reverse link receiver (RL RCVR) 538. Reverse link receiver 538 downconverts, filters and amplifies the signal and provides the signal to matched filter 536. Matched filter 536 generates an output signal the energy of which is proportional to the correlation of the expected probe symbol sequence to the received symbol sequence. The energy values are provided to control processor 534. Upon detection of the probe sequence, control processor 534 provides a signal to base station controller 506 indicative of the time of the reception of the probe sequence from fixed dummy station 506.

Similarly, at base station 502, the probe signal is received by antenna 518 and provided to reverse link receiver (RL RCVR) 520. Reverse link receiver 520 downconverts, filters and amplifies the signal and provides the signal to matched filter (MF) 522. Matched filter 522 generates an output signal, the energy of which is proportional to the correlation of the expected probe symbol sequence to the received symbol sequence. The energy values are provided to control processor 534. Upon detection of the probe sequence, control processor 534 provides a signal to base station controller indicative of the time of the reception of the probe sequence from fixed dummy station 506. Base station controller determines the timing error correction between base stations 504 and 502 and transmits messages indicative of the timing correction to base stations 504 and 506 in accordance with equation (2) above.

In base station 502, the timing error correction signal is received by control processor 524 which provides a timing adjustment signal to clock 516. The adjusted clock signal is then used by forward link (FL) modulator 510 in the generation of the PN sequences used to spread the outbound data. Pilot and traffic symbols provided to forward link modulator 510 are spread in accordance with PN sequences determined in accordance with the corrected clock signal. The spread signal is provided to forward link transmitter (FL TMTR) 512. Transmitter 512 upconverts, filters and amplifies the signal in accordance with the forward link frequency band and provides the resulting signal to antenna 514 for transmission.

Similarly, in base station 504, the timing error correction signal is received by control processor 534 which provides a timing adjustment signal to clock 532. The adjusted clock signal is then used by forward link (FL) modulator 530 in the generation of the PN sequences used to spread the out bound data. Pilot and traffic symbols provided to forward link modulator 530 are spread in accordance with PN sequences determined in accordance with the corrected clock signal. The spread signal is provided to forward link transmitter (FL TMTR) 532. Transmitter 528 upconverts, filters and amplifies the signal in accordance with the forward link frequency band and provides the resulting signal to antenna 526 for transmission.

V. Fixed Transponder

A fifth embodiment of the present invention for base synchronization involves use of a simple transponder. As with the fixed dummy station of methods described above, this transponder is placed so that it can receive signals from two or more base stations.

The transponder periodically digitizes and stores the received signals on the forward link for a short time, and retransmits these samples on the reverse link. So the transponder gets a snapshot of the base station pilot transmissions which may be used to determine the relative timing of the base stations. Rather than process this information in the transponder, it is simply relayed to the base stations for analysis. This approach allows for a low-cost, low-power device to be employed. The transponder may also simply perform a frequency translation of the incoming forward link signal and retransmit on the reverse link without storing the signal. This requires the transponder to receive and transmit at the same time, but avoids the requirement of A/D conversion and storage of the samples.

The transponder is not, in general, synchronized with the CDMA system. To simplify the processing at the base station (s) to detect the transponder transmission, the transmission is performed at fixed intervals (for example, every 10 minutes or so). The ambiguity in the timing of the pulse is just due to the error in the transponder clock over the time between transmissions. With a clock accuracy of $3 \times 10^{-7}$ (a good low power TCXO), the drift is only 180 μsec every 10 minutes.

To simplify the base station search further, the transponder sends its burst transmission at a reasonably high power level. This results in no significant degradation in the system performance, since it occurs infrequently. The transmission may also be proceeded by a short fixed preamble, a PN code unique to a particular transponder which may be detected by a simple matched filter at the base station.

Figure 6:
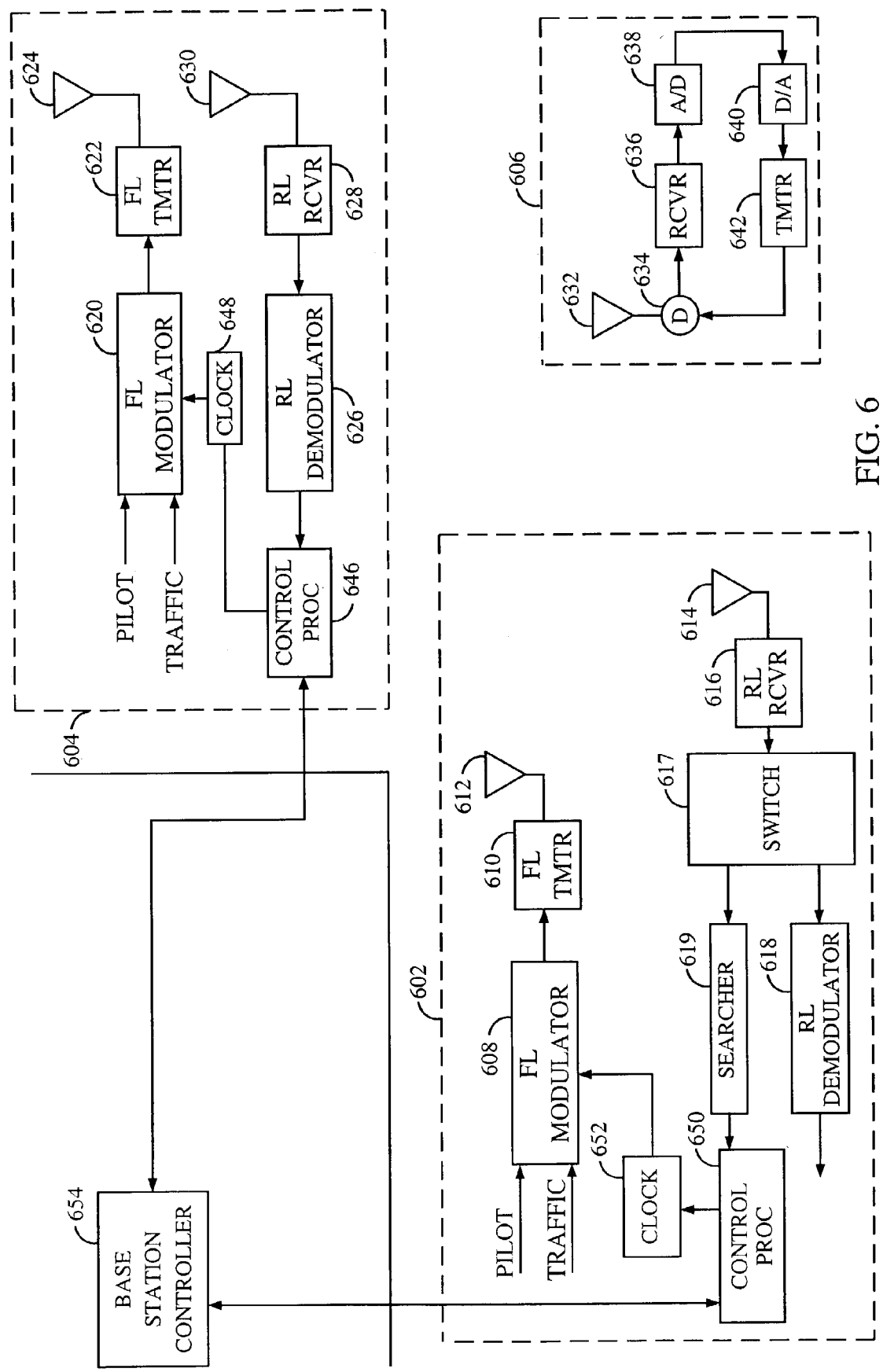
FIG. 6 is a block diagram of the sixth embodiment wherein a fixed dummy station receives the forward link signals from two base stations and transmits the received signals back to the base stations so that they can be used to provide synchronization.

Referring to FIG. 6, in base station 602, the pilot and traffic symbols are provided to forward link (FL) modulator 608. In the exemplary embodiment, forward link modulator 608 is code division multiple access modulator as described in detail in the aforementioned U.S. Pat. No. 5,103,459. The code division multiple access signal is then provided to forward link transmitter (FL TMTR) 610, which upconverts, filters and amplifies the forward link signal for transmission through antenna 612. Reverse link signals are received through antenna 614 and provided to reverse link receiver (RL RCVR) 616. Receiver 616 downconverts, filters and amplifies received reverse link signals in accordance with the reverse link frequency band and provides the received signal through switch 617 to reverse link demodulator 618. An exemplary embodiment of a method and apparatus for demodulating CDMA signals is described in aforementioned U.S. Pat. No. 5,654,979.

Similarly, in base station 604, the pilot and traffic symbols are provided to forward link (FL) modulator 620. In the exemplary embodiment, forward link modulator 620 is code division multiple access modulator as described in detail in the aforementioned U.S. Pat. No. 5,103,459. The code division multiple access signal is then provided to forward link transmitter (FL TMTR) 622, which upconverts, filters and amplifies the forward link signal for transmission through antenna 624. Reverse link signals are received through antenna 630 and provided to reverse link receiver (RL RCVR) 628. Receiver 628 downconverts, filters and amplifies received reverse link signals in accordance with the reverse link frequency band and provides the received signal to reverse link (RL) demodulator 626.

The forward link signals from both base stations 602 and 604 are received by antenna 632 of fixed dummy station 606. The signal is provided through duplexer 634 to receiver (RCVR) 636. Receiver 636 downconverts, filters and amplifies the signal in accordance with the reverse link frequency. The received signals are provided to analog to digital converter (A/D) 638. The digitized samples of the received signal are provided to digital to analog converter (D/A) 640. Digital to analog converter 640 converts the received digitized samples back to analog format for upconversion to the reverse link frequency. The digitized samples are provided to transmitter (TMTR) 642 which upconverts, filters and amplifies the signal in accordance with the reverse link frequency band and provides the signal through duplexer 634 for transmission through antenna 632.

In the exemplary embodiment, the burst transmission from fixed dummy station 606 which is a frequency translation of the received digitized samples in the forward link frequency band is received by either base station 604 or base station 602. When the probe is received at base station 602, probe is received by antenna 614 and provided to reverse link receiver (RL RCVR) 616. Receiver 616 downconverts, filters and amplifies the received probed in accordance with the reverse link frequency band. At the predetermined time interval when the probe is anticipated to arrive, switch 617 provided the received signal to searcher 619.

Searcher 619 determines the relative phases of the base station transmissions which relayed by the transponder 606. The PN searcher must examine the signal for a window around the expected transmission time of the transponder, since the transponder is not synchronized with the network, and some timing drift may have occurred since the last burst transmission. Searcher 619 performs the forward link search operation as described with respect to forward link demodulator 136 of the first embodiment. Searcher 619 detects the phase of the forward link signals from base stations 602 and 604. In the exemplary embodiment, searcher 619 detects the phase offset of the pilot channels from base stations 602 and 604.

Searcher 619 provides the detected phase of the forward link signals to control processor 650, which computes the adjustment necessary to synchronize the internal clocks of base stations 602 and 604. This timing adjustment is either applied by the base station which performed the search, or sent to the base station controller on a backhaul link to be relayed to base station 604.

If the timing adjustment is to be performed by base station 602, then control processor 650 computes the necessary change to the internal timing of base station 602 and provides a signal indicative of that change to clock 652. Clock 652 adjusts its timing in accordance with the signal and forward link modulator 608 uses the adjusted clock in the modulation of the forward link signal from base station 602.

If the timing adjustment is to be performed by base station 602, then control processor 650 computes the necessary change to the internal timing of base station 604 and provides a signal indicative of that change to base station controller 654. Base station controller 654 sends a message indicative of the timing adjustment to control processor 646 of base station 604. Control processor 646 sends a signal to clock 648, in response to which the timing of clock 648 is adjusted. Clock 648 adjusts its timing in accordance with the signal and forward link modulator 620 uses the adjusted clock in the modulation of the forward link signal from base station 604.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of providing synchronization in a wireless communication system, comprising:
   receiving a first signal at a first base station from a second base station on a forward link frequency band;
   adjusting an internal clock at the first base station in accordance with said received first signal;
   transmitting a second signal from the first base station to the second base station on said forward link frequency band; and
   inhibiting at the first base station transmission of said second signal to the second base station on said forward link frequency band while receiving said first signal from said second base station.

2. A base station for a wireless communication system, comprising:
   means for receiving a first signal from a second base station on a forward link frequency band;
   means for adjusting an internal clock in accordance with said received first signal;
   means for transmitting a second signal to the second base station on said forward link frequency band; and
   means for inhibiting transmission of said second signal to the second base station on said forward link frequency band while receiving said first signal from said second base station.

3. A method of providing synchronization in a wireless communication system, comprising:
   transmitting signals on a forward link frequency band;
   receiving a reverse link signal from a mobile station on a reverse link frequency band;
   transmitting a synchronization probe to a base station on said reverse link frequency band; and
   inhibiting the reception of said reverse link signal from said mobile station while said synchronization probe is transmitting on said reverse link frequency band to the base station.

4. A base station for a wireless communication system, comprising:
   means for transmitting signals on a forward link frequency band;
   means for receiving a reverse link signal from a mobile station on a reverse link frequency band;
   means for transmitting a synchronization probe to a second base station on said reverse link frequency band; and
   means for inhibiting the reception of said reverse link signal from said mobile station while said synchronization probe is transmitting on said reverse link frequency band to the second base station.

* * * * *